(12) United States Patent
Lillibridge et al.

(10) Patent No.: US 8,499,131 B2
(45) Date of Patent: Jul. 30, 2013

(54) CAPPING A NUMBER OF LOCATIONS REFERRED TO BY CHUNK REFERENCES

(75) Inventors: Mark David Lillibridge, Mountain View, CA (US); David Malcolm Falkinder, Bristol (GB); Graham Perry, Bristol (GB)

(73) Assignee: Hewlett-Packard Development Company, L.P., Houton, TX (US)

( * ) Notice: Subject to any disclaimer, the term of this patent is extended or adjusted under 35 U.S.C. 154(b) by 337 days.

(21) Appl. No.: 12/759,174

(22) Filed: Apr. 13, 2010

(65) Prior Publication Data

US 2011/0252217 A1 Oct. 13, 2011

(51) Int. Cl.
*G06F 12/16* (2006.01)

(52) U.S. Cl.
USPC ............... 711/162; 711/154; 711/E12.103

(58) Field of Classification Search
None
See application file for complete search history.

(56) References Cited

U.S. PATENT DOCUMENTS

| | | | |
|---|---|---|---|
| 5,369,778 A | 11/1994 | San Soucie | |
| 6,396,838 B1 | 5/2002 | Palnati | |
| 6,795,963 B1 | 9/2004 | Andersen | |
| 7,269,689 B2 | 9/2007 | Eshghi | |
| 7,472,242 B1 * | 12/2008 | Deshmukh et al. | 711/162 |
| 7,567,188 B1 | 7/2009 | Anglin | |
| 7,631,155 B1 | 12/2009 | Bono | |
| 7,747,584 B1 * | 6/2010 | Jernigan, IV | 707/692 |
| 8,150,851 B2 | 4/2012 | Jones | |
| 2005/0108433 A1 | 5/2005 | Wu | |
| 2007/0239946 A1 * | 10/2007 | Zhu | 711/154 |
| 2007/0255758 A1 * | 11/2007 | Zheng et al. | 707/200 |
| 2008/0005141 A1 * | 1/2008 | Zheng et al. | 707/101 |
| 2008/0034268 A1 * | 2/2008 | Dodd et al. | 714/755 |
| 2008/0052468 A1 | 2/2008 | Speirs | |
| 2008/0098083 A1 * | 4/2008 | Shergill et al. | 709/217 |
| 2008/0133561 A1 | 6/2008 | Dubnicki | |
| 2008/0244210 A1 | 10/2008 | Vingralek | |
| 2008/0270461 A1 | 10/2008 | Gordon | |
| 2009/0019246 A1 | 1/2009 | Murase | |
| 2009/0037499 A1 | 2/2009 | Muthulingam | |
| 2009/0077342 A1 | 3/2009 | Chen | |
| 2009/0112946 A1 | 4/2009 | Jones | |
| 2009/0254609 A1 * | 10/2009 | Wideman | 709/203 |
| 2009/0313248 A1 | 12/2009 | Balachandran | |
| 2010/0037118 A1 | 2/2010 | Saliba | |
| 2010/0042790 A1 * | 2/2010 | Mondal et al. | 711/161 |

(Continued)

FOREIGN PATENT DOCUMENTS

WO 2009054827 4/2009
WO 2009131585 A1 10/2009

OTHER PUBLICATIONS

Mark Lillibridge, Kaye Eshghi, Deepavali Bhagwat, Vinay Deolalikar, Greg Trezise, and Peter Camble. 2009. Sparse indexing: large scale, inline deduplication using sampling and locality. In Proccedings of the 7th conference on File and storage technologies (FAST '09), Margo Seltzer and Ric Wheeler (Eds.). USENIX Association, Berkeley, CA, USA, 111-1.*

(Continued)

*Primary Examiner* — Edward Dudek, Jr.
*Assistant Examiner* — Ralph A Verderamo, III

(57) ABSTRACT

As part of a deduplication process, chunks are produced from data. The chunks are assigned to locations in a data store, where the assignments are such that a number of locations referenced is capped according to at least one predefined parameter.

19 Claims, 4 Drawing Sheets

U.S. PATENT DOCUMENTS

| | | |
|---|---|---|
| 2010/0198792 A1 | 8/2010 | Camble |
| 2011/0145207 A1 | 6/2011 | Agrawal |
| 2011/0231362 A1 | 9/2011 | Attarde |
| 2012/0036113 A1 | 2/2012 | Lillibridge |

OTHER PUBLICATIONS

Sean Rhea, Russ Cox, and Alex Pesterev. 2008. Fast, inexpensive content-addressed storage in foundation. In USENIX 2008 Annual Technical Conference on Annual Technical Conference (ATC'08). USENIX Association, Berkeley, CA, USA, 143-156.*

Jula et al., "How to Focus on Memory Allocation Strategies," Technical Report TR07-003, Jun. 18, 2007 (29 pages).

Prof. David August, "Optimizing Malloc and Free," (8 pages) (2006), http://www.cs.princeton.edu/courses/archive/fall07/cos217/lectures/15Memory-2x2.pdf.

Muthitacharoen et al., "A Low-Bandwidth Network File System" (14 pages) (2001).

Wendt, Symantec Corporation, A Candid Examination of Data Deduplication, Aug. 2009 (10 pages).

Quantum, White Paper, Data Deduplication Background: A Technical White Paper, Jan. 2009 (12 pages).

IBM, www-07.ibm.com/sg/smarterbusiness/meettheexperts/manage_6.html, Information Protection Services dated Jan. 2010 (2 pages).

Peters, White Paper, The Benefits of Two-Stage Online Data Vaulting, Focus on the Digi-Data "Safe" Offering, Nov. 2009 (12 pages).

Poelker, ComputerWorld Blogs, http://blogs.computerworld.com/poelker, Jan. 2010 (3 pages).

U.S. Appl. No. 12/850,142, Non-Final Rejection dated Mar. 28, 2012, pp. 1-8 and attachments.

U.S. Appl. No. 12/258,638, Non-Final Rejection dated Sep. 23, 2011, pp. 1-9 and attachment.

U.S. Appl. No. 12/258,638, Notice of Allowance dated Jan. 5, 2012, pp. 1-4 and attachments.

Wendt, Jerome M., SIS Versus Block-Based Deduplication: The Forgotten Deduplication Debate, Jun. 9, 2008, http://commvauit.dciginc.com/2008/06/sis-versus-blockbased-deduplic.html, 2 pps.

U.S. Appl. No. 12/850,142, Final Rejection dated Jan. 25, 2013, pp. 1-19 and attachments.

* cited by examiner

CAPPING A NUMBER OF LOCATIONS REFERRED TO BY CHUNK REFERENCES

BACKGROUND

As capabilities of computer systems have increased, the amount of data that is generated and computationally managed in enterprises (companies, educational organizations, government agencies, and so forth) has rapidly increased. Data may be in the form of emails received by employees of the enterprises, where emails can often include relatively large attachments. Moreover, computer users routinely generate large numbers of files such as text documents, multimedia presentations, and other types of data objects that have to be stored and managed.

BRIEF DESCRIPTION OF THE DRAWINGS

Some embodiments are described with respect to the following figures.

DETAILED DESCRIPTION

In an enterprise, such as a company, an educational organization, a government agency, and so forth, the amount of data stored can be relatively large. To improve efficiency, deduplication of data can be performed to avoid or reduce repeated storage of common portions of data in a data store. In some implementations, deduplication of data can be accomplished by partitioning each data object into non-overlapping chunks, where a "chunk" refers to a piece of data partitioned from the data object, and where the data object can be in the form of a file or other type of data object. Examples of data objects include documents, image files, video files, audio files, backups, or any other collection or sequence of data. Upon receiving an input data object, the input data object is divided into chunks by applying a chunking technique. Note that if a data object is sufficiently small, the chunking technique may produce just one chunk.

By dividing each data object into chunks, a system is able to identify chunks that are shared by more than one data object or occur multiple times in the same data object, such that these shared chunks are stored just once in the data store to avoid or reduce the likelihood of storing duplicate data.

One of the issues associated with using chunk-based deduplication is fragmentation of data. Fragmentation refers to the issue of chunks associated with a particular data object being stored in disparate locations of a data store. For enhanced deduplication, each chunk is (ideally) stored only once and thus is located in just one location of the data store but yet can appear in multiple data objects. This leads to increased fragmentation where chunks of a data object are scattered across a storage media, which can cause read-back of data from the data store to be relatively slow. If the data store is implemented with a disk-based storage device, when a data object is being read back, the chunks of the data object may be scattered across the surface of disk media of the disk-based storage device. This scattering of chunks across the disk media of the disk-based storage device can result in multiple seeks to retrieve the scattered chunks, which can lead to slow read-back operation.

Figure 1:
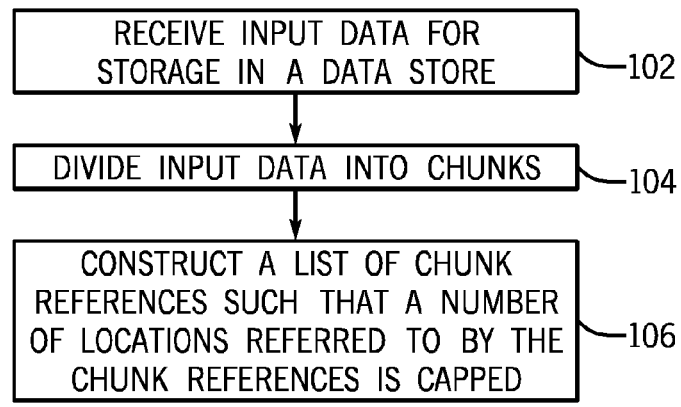
FIG. 1 is a flow diagram of a process of chunk location assignment according to some embodiments.

In accordance with some embodiments, as shown in FIG. 1, a chunk location assignment technique is provided to store data chunks in a manner that improves read-back performance. A benefit provided by some implementations of the technique according to FIG. 1 is reduced fragmentation in the storage of chunks. Note that in other implementations, other or alternative benefits can be provided by the technique of FIG. 1.

Input data is received (at 102) for storage in a data store. The input data is divided (at 104) into chunks (referred to as "input data chunks"). A list of chunk references is then constructed (at 106) such that a number of locations in the data store referred to by the chunk references is capped by at least one parameter. A chunk reference is a value that provides an indication of a location of a corresponding chunk. For example, the chunk reference can be in the form of a pointer (to a location), a hash value (that provides an indication of a location), an address, or some other location indication. The chunk reference can point or otherwise refer to a storage region or a logical storage structure that is able to store multiple chunks. Alternatively, the chunk reference can point or otherwise refer to just an individual chunk.

A "list" refers to a data structure that provides an ordering of content in the list, which in this discussion includes chunk references. The ordering of the chunk references allow the list of chunk references to be used for restoring corresponding input data, which can be one data object or multiple data objects (such as multiple data objects in a stream or some other type of sequence).

A "location" of a data store in which a chunk is stored refers to a storage structure (logical or physical) that is able to store one or multiple chunks. Thus, multiple locations refer to multiple storage structures. In some implementations, the locations are implemented in the form of chunk containers (or more simply "containers"), where each container is a logical data structure of a data store for storing one or multiple chunks. A container can be implemented as a discrete file or object. In alternative implementations, instead of using discrete containers to store respective chunks, a continuous storage area can be defined that is divided into a number of regions, where each region is able to store respective one or multiple chunks. Thus, a region of a continuous storage area is also another type of "location."

New input data chunks are stored in the data store according to the list of chunk references; the other input data chunks already have copies in the data store at locations according to the list of chunk references.

In the ensuing discussion, reference is made to "containers" to which chunks of input data are to be assigned for storage in a data store. In alternative implementations, assignment of chunks can be made to other types of locations (such as regions of a continuous storage area) using some techniques discussed herein.

In addition, reference is made to processing a stream of input data. In some implementations, it is noted that multiple streams of input data can be processed in parallel. More generally, reference is made to "input data," which refers to some amount of data that has been received for storage in a data store. In some examples, the data store can be part of a backup storage system to store backup copies of data. In other implementations, the data store can be part of an archival storage system, or more generally, can be part of any storage system or other type of computing system or electronic device.

Receiving input data by a system refers to the system receiving the input data from an external data source or from multiple external data sources. Alternatively, receiving input data by a system refers to the system receiving the input data created within the system.

Figure 2:
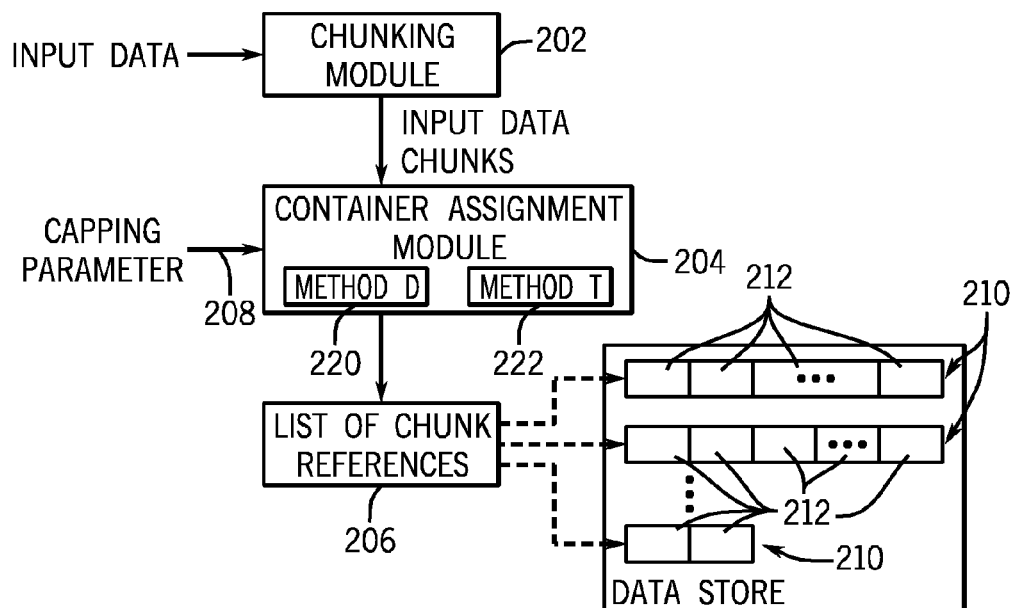
FIG. 2 is a schematic diagram of a system that has a container assignment module according to some embodiments to assign input data chunks to containers.

As shown in FIG. 2, as the input data is received, the input data is divided by a chunking module 202 that applies a chunking technique. Examples of chunking techniques are described in Athicha Muthitacharoen et al., "A Low-Bandwidth Network File System," Proceedings of the 18$^{th}$ (ACM) Symposium on Operating Systems Principles, pp. 174-187 (2001), and in U.S. Pat. No. 7,269,689.

The chunking module 202 produces input data chunks based on the received input data. In some implementations, the tasks performed by the chunking module 202 include tasks 102 and 104 of FIG. 1.

Based on the input data chunks from the chunking module 202, a container assignment module 204 constructs (106 in FIG. 1) a list (206) of chunk references, where the list 206 of chunk references is constructed such that a number of containers referred to by the chunk references is capped by at least one predefined parameter (identified as capping parameter 208 in FIG. 2). The chunk references in the list 206 refer to corresponding containers 210 in a data store 214, where each of the containers 210 stores one or multiple chunks 212.

More generally, the containers 210 are locations, while the container assignment module 204 is a location assignment module. In such more general implementations, the location assignment module generates the list 206 of chunk references that refer to corresponding locations in the data store 214.

In performing chunk container assignment according to some implementations, the container assignment module 204 determines whether there are copies of the input data chunks that are already stored in the data store 214. It is possible that a copy of a particular one of the input data chunks (derived from the input data) may already exist in the data store 214. It is also possible that another one of the input data chunks is a new chunk that does not have any copy in the data store 214. As discussed further below, the container assignment module 204 has a method D 220 for performing tentative assignment of locations to input data chunks for which copies already exist in the data store 214, and a method T 222 for performing tentative assignment of locations to new chunks for which copies do not yet exist in the data store 214. The concept of tentative assignment of locations is discussed further below.

Figure 3:
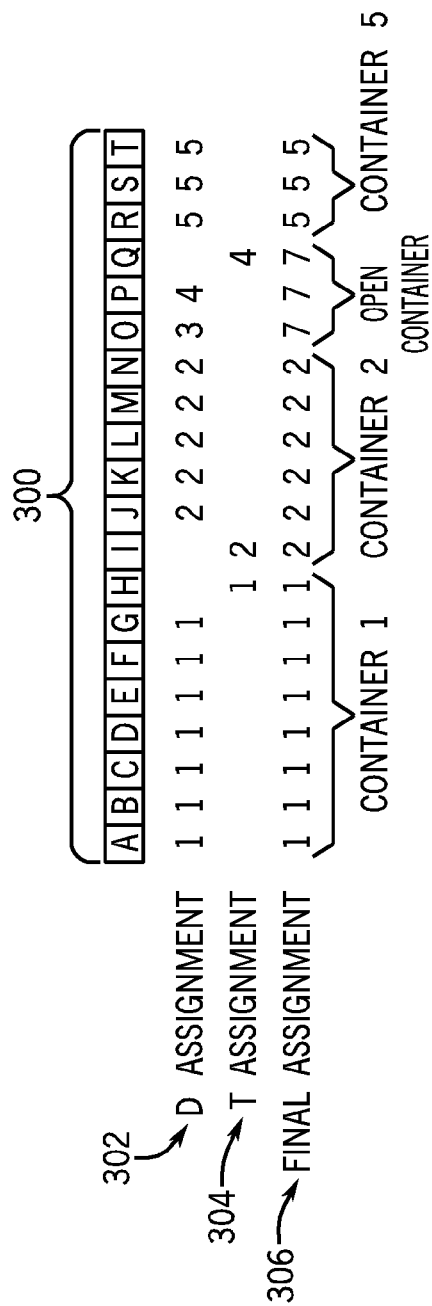
FIG. 3 illustrates assignment of chunks of input data to containers, in accordance with some embodiments.

Some implementations of a chunk container assignment technique are discussed in the context of the specific example depicted in FIG. 3. FIG. 3 illustrates incoming chunks (300) that have been produced from input data, such as by the chunking module 202 of FIG. 2. The chunks are labeled A, B, C, . . . , T in FIG. 3. In FIG. 3, it is assumed that the chunk container assignment technique according to some implementations is applied on N incoming chunks (as produced by the chunking module 202) at a time, where N can be statically or dynamically set. For this example, it is assumed that N is 20.

Upon receiving N incoming chunks, the method D and the method T can be invoked. In some implementations, the chunk container assignment technique does not invoke or have a method T.

The method D is used to determine if copies of any of the incoming chunks (300) already exist in the data store 214, and generates an overall tentative assignment 302 (referred to as a "D assignment"), which tentatively assigns one or more input data chunks to containers of the data store. The D assignment 302 generated by the method D contains information identifying tentative chunk assignments (in the form of chunk references) of incoming chunks determined by the method D to have copies already in the data store 214. In the FIG. 3 example, the method D was able to determine that copies of incoming chunks A-G, J-P, and R-T already exist in the data store 214. In the FIG. 3 example, each number of the D assignment 302 that is next to the respective incoming chunk is a chunk reference to the corresponding container.

Thus, for example, incoming chunk A is tentatively assigned by the method D to container 1 (the chunk reference in the D assignment 302 corresponding to incoming chunk A is 1) since the method D was able to determine that a copy of the incoming chunk A already exists in container 1 in the data store 214. As another example, the incoming chunk 0 is tentatively assigned to container 3 (the chunk reference in the D assignment 302 corresponding to incoming chunk 0 has a value of 3) in response to the method D determining that a copy of incoming chunk 0 exists in container 3 in the data store 214.

It is also noted that if the method D determines that no copies exist in the data store 214 for any of the incoming chunks 300, then the D assignment 302 would be empty for those input data chunks.

The method T generates a T assignment 304 for tentatively assigning (using chunk assignments) each new chunk (a new chunk is an incoming chunk for which a copy does not already exist in the data store 214) to a container in the data store 214 that the chunk is tentatively planned to be stored in. In the FIG. 3 example, incoming chunks H, I, and Q are new chunks for which copies do not already exist in the data store 214. Some implementations of method T may not tentatively assign all new chunks. In cases where method D fails to identify some input data chunks as already having copies in the data store, method T may generate tentative assignments for those chunks as well.

In some implementations of method T, a new chunk is assigned to the same container as its neighbors when possible. In the FIG. 3 example, new chunk H is a neighbor of chunk G, so new chunk H is tentatively assigned to container 1 (the container that already stores a copy of chunk G). On the other hand, since new chunk I is a neighbor of chunk J, new chunk I is tentatively assigned to container 2. Similarly, since new chunk Q is a neighbor of chunk P, new chunk Q is tentatively assigned to the same container as chunk P (container 4). In other implementations, other criteria for tentatively assigning new chunks to containers can be employed by the method T.

In some implementations, the D assignment 302 is in the form of a list produced by the method D, where this list (referred to as a "D list") contains chunk references for incoming chunks for which copies already exist or are known to already exist in the data store 214. In such implementations, the T assignment 304 may be in the form of a list produced by the method T, where this list (referred to as a "T list") contains chunk references for new chunks (in the incoming chunks).

Although the D assignment 302 and T assignment 304 are shown as separate assignments (e.g., separate lists) in FIG. 3, note, however, that the D assignment 302 and T assignment 304 can actually be part of one assignment (e.g., one list of tentatively assigned chunk references that associate incoming chunks with corresponding containers). Thus reference to D and T assignments can refer to just one data structure that includes the chunk references of the D and T assignments, or to multiple data structures including the chunk references of the D assignment and the chunk references of the T assignment, respectively.

Both the D assignment 302 and T assignment 304 are tentative assignments that are subject to modification based on the capping parameter 208 (FIG. 2). In some examples, the capping parameter 208 is referred to as C. Although reference is made to just one capping parameter, note that in alternative implementations, multiple capping parameters can be employed. In the FIG. 3 example, it is assumed that C is 3, which means that the number of containers (possibly not counting an "open" container) identified by final assignment 306 should be less than or equal to 3.

In some implementations, there is a specially designated container, the "open" container, that new input data chunks not known to be related to any previous chunks (e.g., not a neighbor of chunk already having a copy in the data store) are placed. Such chunks are placed in this open container until the open container becomes full. At that point, it is closed and a new empty open container is created. Note that when the store is empty, most input data chunks will be of this kind. In some implementations, there is one open container per input stream of data being processed, with the unrelated chunks of a given stream being placed in its associated open container. Open container hereafter will only refer to open containers associated with the current input stream being processed.

The containers identified by the D assignment 302 and T assignment 304 in this example are "non-open" containers.

In the FIG. 3 example, the open container is container 7, while non-open containers are containers 1-5 (container 6 is not shown in the example). In some implementations, the open container is not counted towards the cap when producing the final assignment 306 from the D assignment and T assignment based on the capping parameter C. The D assignment and T assignment in the FIG. 3 example refer to five containers (1-5), which means that the tentative assignments of some of the incoming chunks (300) will have to be modified to satisfy the capping parameter C.

The container assignment module 204 can decide, in the FIG. 3 example, to use just containers 1, 2, and 5. The decision to use certain containers over other containers is based on a predefined criterion. In some implementations, the predefined criterion specifies that containers with a larger number of chunks tentatively assigned to them are to be used over containers with smaller numbers of chunks tentatively assigned to them. More generally, the predefined criterion includes a criterion preferring locations (e.g., containers) to which more chunk references of the D and T assignments refer. In some implementations, only chunk references from the D method are counted.

Alternatively, or in addition, the predefined criterion can also include a criterion that disfavors using a location (e.g., container) that is not referred to by a number of chunk references of the D and T assignments that exceeds a predefined parameter. In other words, this predefined parameter specifies a minimum number of chunk references, and a location (e.g., container) is not favored to be used unless the number of chunk references in the D and T assignments 302 and 304 to such location exceeds the minimum parameter.

In the FIG. 3 example, since the decision is made to use containers 1, 2, and 5, the incoming chunks that have been tentatively assigned to other containers (including incoming chunks O, P, and Q) are unassigned from the respective containers identified in the D and/or T assignments 302, 304, and assigned to a different container. The process of unassigning a chunk and assigning the chunk to a different container is referred to as reassigning the chunk. In some implementations, the unassigned incoming chunks are always assigned to the open container (which in FIG. 3 is container 7).

Based on the modification of the D and/or T assignments 302, 304, a final assignment (306) is generated by the container assignment module 204. The final assignment 306 is the list of chunk references 206 depicted in FIG. 2. This final assignment 306 keeps the tentative assignments (in the D and/or T assignments 302, 304) for all incoming chunks except chunks O, P, and Q, which have been reassigned to open container 7. The final assignment 306 satisfies the capping parameter C. (Remember that in some implementations, the current open container does not count towards the cap threshold.)

In some implementations, the number of containers is reduced to a value C+1, or less, by the container assignment module 204, according to the capping parameter C (208 in FIG. 2). Note that, however, that there is a cost to performing the modification of the D assignment 302. In the FIG. 3 example, chunks O and P, which already exist in containers 3 and 4, respectively, will be duplicated in container 7, which reduces deduplication, but leads to reduced fragmentation in some examples.

As noted above, in some implementations, the D assignment 302 and the T assignment 304 can be implemented with one or multiple respective lists of tentative chunk references—such list (or multiple lists) is (are) referred to as tentative list(s). The tentative list(s) is (are) modified to produce the final assignment 306, which can also be implemented as a list. In modifying the tentative list(s) to achieve the final list, either the tentative list(s) can be changed to result in the final list, or alternatively, the tentative list(s) can first be copied, with the copied list changed to achieve the final list, or alternatively, the final list can be produced directly from the tentative list(s).

Figure 4:
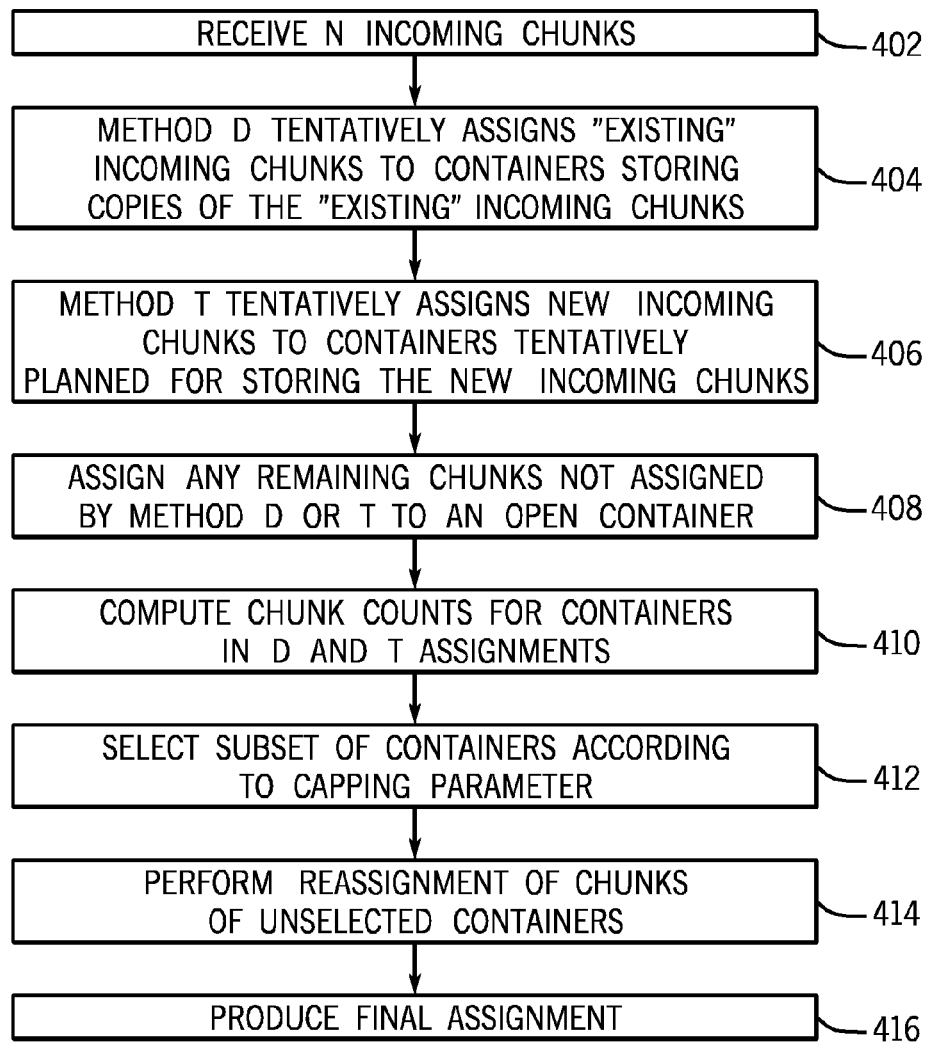
FIG. 4 is a flow diagram of a process of chunk container assignment according to further embodiments.

FIG. 4 is a flow diagram of a chunk container assignment process according to further embodiments. The process of FIG. 4 can be performed by the container assignment module 204 of FIG. 2.

A group of N incoming chunks are received (at 402). The method D is invoked to tentatively assign (at 404) "existing" incoming chunks to containers of copies of the "existing" incoming chunks. An "existing" incoming chunk refers to a chunk for which a copy already exists in the data store 214. Note that method D may not in fact assign all "existing" incoming chunks, because it may fail to realize that some chunks already have copies in the data store.

Further, the method T is invoked to tentatively assign (at 406) new incoming chunks to containers tentatively planned for storing those chunks. Each new incoming chunk may be tentatively assigned to a container where it is tentatively planned to store that chunk.

Any remaining chunks not assigned by the method D or method T are assigned (at 408) to an open container.

Figure 5:
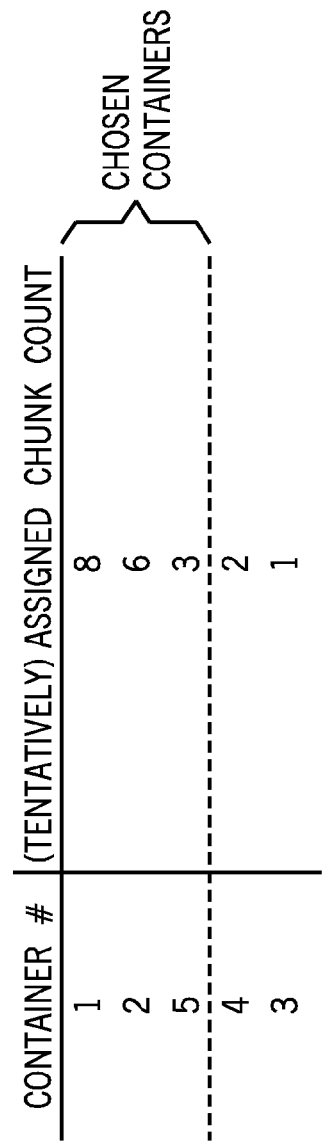
FIG. 5 illustrates a list of containers and corresponding chunk counts, used in processes according to some embodiments.

Chunk counts are computed (at 410) for containers referenced by the D and T assignments. One example of computing chunk counts is depicted in FIG. 5, which corresponds to the example of FIG. 3. The containers that are specified in the D and T assignments 302, 304 include containers 1-5 (the open container 7 is not illustrated in the FIG. 5 example, although in some other implementations the chunk count can be computed for the open container as well). The first column of the table in FIG. 5 lists the container numbers (of containers referenced in the D and T assignments), while the second column of the table of FIG. 5 includes the corresponding tentatively assigned chunk counts. Container 1 has a chunk count of 8, since container 1 is tentatively assigned 8 incoming chunks, namely A-G and H in FIG. 3.

Based on the predefined criterion that prefers containers associated with larger numbers of tentatively assigned chunks, containers 1, 2, and 5 are chosen according to the capping parameter C for inclusion in the final assignment (e.g., 306 in FIG. 3).

Referring again to FIG. 4, a subset (which can be all or less than all of the containers) is selected (at 412) according to the capping parameter. Reassignment of chunks of any unselected containers is then performed (at 414), where reassigning involves unassigning a chunk from a first container and assigning the unassigned chunk to a second container. Based on the reassignment, a final assignment is produced (at 416).

As discussed above, instead of using discrete containers, corresponding groups of chunks can be stored in respective regions of a continuous storage area. In such implementations, the chunk references can be discrete region numbers, in some examples.

The foregoing provides a discussion in which it was assumed that the parameters N and C are static. In other implementations, either or both of N or C can be variable based on predefined condition(s). For example, the capping parameter C can be based on a running average of containers used for each stream of incoming chunks (300 in FIG. 3). The capping parameter C can be increased when the running average is below a particular goal, while the capping parameter C can be reduced when the running average is above the particular goal.

In some scenarios, it may be possible that the D assignment 302 and T assignment 304 (which are tentative assignments) result in a tentative assignment of exactly C+1 containers, with none of the incoming chunks tentatively assigned to the open container. In such scenarios, the incoming chunks tentatively assigned to the $(C+1)^{th}$ most desirable container are reassigned to the open container, according to the examples discussed above. Although this has no effect on the number of containers used—the total number of containers used is still (C+1)—it may reduce deduplication and increase subsequent fragmentation. Accordingly, in some implementations, the container assignment module 204 (FIG. 2) may decide not to reassign the chunks of the $(C+1)^{th}$ container to the open container in such situations.

As noted above, the selection of which containers (referenced by the D and T assignments) to use for inclusion in the final assignment 306 can be based on a predefined criterion. In some cases, a tie may result for two or more of the containers. For example, two or more of the containers can include the same number of chunks. Ties can be broken randomly or using any other type of mechanism.

In the discussion above, it is assumed that the D-assigned chunks (for "existing" incoming chunks) and the T-assigned chunks (for new chunks) are weighted equally when computing a chunk count for each container referenced by the D and T assignments 302, 304. In alternative implementations, different weights can be applied to the D-assigned chunks and the T-assigned chunks. For example, a D-assigned chunk in a particular container can have a weight of x while a T-assigned chunk in the particular container has a weight of y where y<x. This is based on the assumption that unassigning an "existing" incoming chunk would lead to increased fragmentation as compared to unassigning a new chunk.

In some implementations, the container assignment module 204 may decide before application of the capping based on the capping parameter 208 (or after application of capping) not to use a non-open container whose chunk count is too low (below a predefined parameter), because the effort of accessing such non-open container with a low chunk count is too high relative to the benefit of using such non-open container.

In some cases, it may be desirable to specify that a particular container (or particular containers) should be used, based on some specific criterion. Assignments to such particular container (or particular containers) may be considered final assignments, since such containers may be used in the final assignment (e.g., 306 in FIG. 3). An example type of the specific criterion that can be used is a read-back criterion. Suppose the input data chunks of the last N chunks were assigned to containers $C_1$ to $C_2$. If at read-back time (when the input data is reconstructed at a later time), there is sufficient cache (in memory) to keep these containers, then when the reader gets to the current N chunks, containers $C_1$ to $C_2$ will already be in cache and thus extra reads will not have to be performed to retrieve them from disk. Thus, any access to those containers ($C_1$ to $C_2$) is effectively free (since those containers are likely to be in memory rather than on disk) so the container assignment module 204 should not unselect those containers and should not count them towards the cap threshold.

In alternative implementations, the decision regarding which containers of the D and T assignments 302, 304 to use can further be based on a lookahead criterion. For example, the container assignment module 204 may be configured to lookahead at the next L chunks (following the current group of N chunks) when processing the current group of N chunks in an attempt to determine which chunk container(s) is (are) predicted to be reused shortly in the next group or groups of N chunks. It is noted that L is an integer greater than or equal to 1. L may be smaller than, equal to, or larger than N.

The foregoing implementations refer to one open container per stream of incoming chunks. Alternatively, there may be more than one type of open container for each stream of incoming chunks. For example, a first type of open container can be assigned "normal" unrelated new chunks, while a second type of open container can be assigned chunks that are determined to be unlikely to be deduplicated against. This second type of container is referred to as an "odds-and-ends" container, which is likely to be ignored by the method D in the subsequent operations. In some implementations, a technique for handling multiple open containers when processing a stream of incoming chunks is to designate one of the multiple open containers as the open container for purposes of exclusion from the count of containers subject to the cap threshold. Alternatively, chunk counts can be computed for all open containers and the one with the highest count is excluded from the containers subject to the cap threshold.

In some implementations discussed above, the container assignment module 204 places all chunks whose tentatively assigned containers were decided not to be used into the open container. In alternative implementations, a subset or all of the chunks tentatively assigned to containers that were decided by the container assignment module 204 not to be used can be reassigned to one or multiple non-open containers that the container assignment module 204 decided to use.

If there are multiple open container types, the type to place chunks that are being reassigned may be selected based on the original containers that the chunks were tentatively assigned to. For example, if a group of chunks that are being reassigned belong to a relatively large number of containers (e.g., greater than some predefined threshold of containers), such chunks can be placed into an odds-and-ends open container; otherwise, the group of chunks being reassigned are placed into the normal open container.

In some implementations, each non-open container can have a specified maximum size, which may affect processing by the method D or T in any (re)assignment task, since the maximum size of a container may prevent chunks from being tentatively or finally assigned to that container.

In practice, copies of a chunk may be located in multiple chunk containers because of duplication. In such scenarios under some implementations, the method D may accordingly occasionally be able to locate multiple copies of a given incoming chunk located in different containers. As a result, the method D may return a list of two or more containers for such chunks. Ideally, the method D should order the lists such that the more "natural homes" for each chunk are listed first (e.g., more of the chunk's likely neighbors are in the same container). Alternatively, the method D may return only the most natural container for each chunk (instead of returning multiple such containers).

In some implementations, the T assignment, the D assignment, and the capping task are performed separately. Alternatively, the T assignment, the D assignment, and the capping task (or a subset of the two) can be combined into a single optimization problem that is solved to select which containers to use, and for each "existing" chunk (an incoming chunk for which a copy already exists in the data store) having copies in multiple containers, which of the containers the "existing" chunk should be assigned to. Also, the optimization problem can consider, for each new chunk, which container the chunk should be tentatively assigned to (T assignment). For example, a new chunk next to two "existing" incoming chunks having copies located in different containers can possibly be tentatively assigned to either of the "existing" chunks' copies' containers. The choices of the optimization problem are subject to the constraint that at most C+1 containers can be used. The optimization problem may be solved for the best solution(s) such that the sum of the used container's (not counting the open container) chunk counts is maximized.

Figure 6:
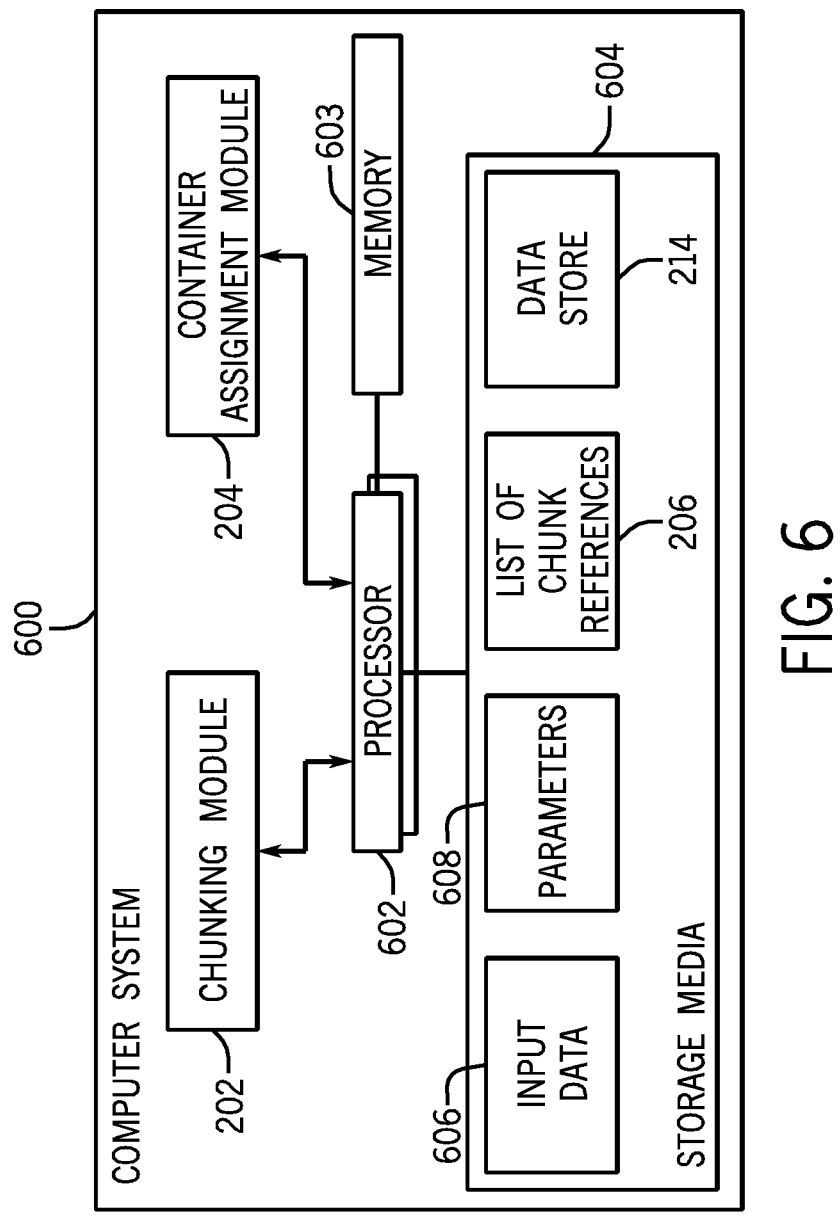
FIG. 6 is a block diagram of an example computer system incorporating some embodiments.

FIG. 6 is a block diagram of an example computer system 600 in which some embodiments can be incorporated. The computer system 600 can be a single-node computer system, or a multi-node, distributed computer system.

The computer system 600 includes the chunking module 202 and the container assignment module 204. The chunking module 202 and container assignment module 204 can be implemented as machine-readable instructions executable on one or multiple processors 602. The one or multiple processors 602 are connected to memory 603 (e.g., volatile memory) and storage media 604 (e.g., persistent storage media such as disk-based storage media or other types of storage media). The storage media 604 stores input data 606 (although in other implementations the input data 606 is not stored), parameters 608 (including the capping parameter C and other parameters discussed above), the list of chunk references 206 (produced by the container assignment module 204), and the data store 214. In some other implementations, some or all of the content of the storage media 604 can be stored in a system separate from the computer system 600.

The memory 603 has faster access speed than the storage media 604, and can be used to temporarily store containers selected to store input data chunks.

The machine-readable instructions of the chunking module 202 or container assignment module 204 are loaded for execution on a processor (such as 602). A processor can include a microprocessor, microcontroller, processor module or subsystem, programmable integrated circuit, programmable gate array, or another control or computing device.

Data and instructions are stored in respective storage devices, which are implemented as one or plural computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or computer-usable storage medium, or alternatively, can be provided on multiple computer-readable or computer-usable storage media distributed in a large system having possibly plural nodes. "Storage media" is intended to either a singular storage medium or plural storage media. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   receiving, by a computer, input data for storage in a data store;
   as part of a deduplication process, dividing, by the computer, the input data into chunks;
   constructing, by the computer, a list of chunk references, wherein each of the chunk references refers to a chunk in the data store, wherein the list of chunk references is usable to restore the input data, and wherein the list of chunk references is constructed such that a number of locations referred to by the chunk references is capped by at least one predefined parameter; and
   tentatively assigning a particular one of the input data chunks to a location of a copy of the particular input data chunk that already exists in the data store.

2. The method of claim 1, wherein one of the input data chunks is a new chunk, a copy of which does not already exist in the data store, the method further comprising:
   tentatively assigning the new chunk to a location in the data store that is tentatively planned for storing the new chunk.

3. The method of claim 1, further comprising:
   tentatively assigning one or more input data chunks to one or more locations of the data store;
   modifying at least one of the tentative assignments; and
   constructing the list of chunk references based on the modified tentative assignments.

4. The method of claim 3, wherein modifying at least one of the tentative assignments is to cause the number of locations referred to by the chunk references in the constructed list of chunk references to be capped by the at least one predefined parameter.

5. The method of claim 4, wherein modifying at least one of the tentative assignments comprises:

identifying a subset of the locations referred to by the tentative assignments to be used, based on a predefined criterion; and modifying the tentative assignments to refer to only locations in the subset.

6. The method of claim 5, wherein the predefined criterion includes a criterion preferring locations to which more of the tentative assignments refer.

7. The method of claim 5, wherein the predefined criterion includes a criterion disfavoring use of a location that is not referred to by a number of the tentative assignments that exceeds a second predefined parameter.

8. The method of claim 5, wherein the locations include containers, one of the containers being an open container, and wherein modifying at least one of the tentative assignments comprises:

changing at least one of the tentative assignments to refer to the open container.

9. The method of claim 5, wherein the locations include containers, one of the containers being an open container, and wherein modifying at least one of the tentative assignments comprises:

changing at least one of the tentative assignments to refer to one of the containers other than the open container.

10. The method of claim 5, wherein if the at least one of the tentative assignments refers to a location of a copy of a given one of the input data chunks in the data store, then modifying the at least one of the tentative assignments causes duplication, in the data store, of the copy of the given input data chunk.

11. The method of claim 5, further comprising:
identifying a particular location that was accessed in processing previous input data, wherein the predefined criterion prefers use of the particular location.

12. The method of claim 5, further comprising:
identifying, using lookahead, a particular location predicted to be reused in processing subsequent input data, wherein the predefined criterion prefers use of the particular location.

13. A method comprising:
receiving, by a computer, input data for storage in a data store;
as part of a deduplication process, dividing, by the computer, the input data into chunks;
constructing, by the computer, a list of chunk references, wherein each of the chunk references refers to a chunk in the data store, wherein the list of chunk references is usable to restore the input data, and wherein the list of chunk references is constructed such that a number of locations referred to by the chunk references is capped by at least one predefined parameter; and
dynamically varying the at least one predefined parameter as additional input data is processed.

14. A method comprising:
receiving, by a computer, input data for storage in a data store;
as part of a deduplication process, dividing, by the computer, the input data into chunks; and
constructing, by the computer, a list of chunk references, wherein each of the chunk references refers to a chunk in the data store, wherein the list of chunk references is usable to restore the input data, and wherein the list of chunk references is constructed such that a number of locations referred to by the chunk references is capped by at least one predefined parameter, wherein constructing the list of chunk references involves solving an optimization problem.

15. An article comprising at least one non-transitory computer-readable storage medium storing instructions that upon execution cause a computer system to:
receive incoming chunks produced as part of a deduplication process;
tentatively assign the incoming chunks to locations in a data store; and
modify at least one of the tentative assignments of the incoming chunks to cap, according to at least one predefined parameter, a number of locations referenced by the tentative assignments after the modifying.

16. The article of claim 15, wherein the incoming chunks include a first incoming chunk and a second incoming chunk, wherein a copy of the first incoming chunk already exists in the data store, wherein the second incoming chunk is a new chunk for which a copy does not yet exist in the data store, and wherein tentatively assigning the incoming chunks comprises:

tentatively assigning the first incoming chunk to a location of the copy of the first incoming chunk in the data store; and
tentatively assigning the second incoming chunk to a location of the data store determined according to a criterion,
wherein modifying the at least one of the tentative assignments comprises modifying one or both of the first and second chunk tentative assignments.

17. The article of claim 15, wherein the instructions are executable to further cause the computer system to:
select, according to a predefined criterion, a subset of the locations referenced by the tentative assignments produced by the tentatively assigning task, the subset being part of the number of locations according to the at least one predefined parameter.

18. The article of claim 17, wherein the predefined criterion is selected from among:
a criterion preferring locations to which more of the tentative assignments refer;
a criterion disfavoring use of a location that is not referred to by a number of the tentative assignments that exceeds a second predefined parameter
a read-back criterion preferring use of a particular location that was accessed in processing previous incoming chunks; and
a lookahead criterion preferring use of a particular location predicted to be reused in processing subsequent incoming chunks.

19. A computer system comprising:
a storage media to store a data store; and
at least one processor to:
receive input data for storage in the data store;
as part of a deduplication process, divide the input data into chunks;
tentatively assign a first of the chunks to a location of a copy of the first chunk already stored in the data store;
tentatively assign a second of the chunks to a location in the data store that is tentatively planned for storing the second chunk, wherein the second chunk is a new chunk for which a copy does not yet exist in the data store; and
modify at least one of the assignments of the first and second chunks to construct a list of chunk references, wherein each of the chunk references refers to a chunk in the data store, wherein the list of chunk references is usable to restore the input data, and wherein the list of chunk references is constructed such that a number of locations referred to by the chunk references is capped by a capping parameter.

* * * * *